J. P. BLACK.

Assignor to the HAPGOOD PLOW COMPANY.

PLANTING PLOW.

No. 10,745. Reissued July 13, 1886.

Witnesses.

Saml. B. Dover.

Arthur Holladay

Inventor:

Joseph. P. Black.

By John Lane.

his Attorney.

UNITED STATES PATENT OFFICE.

JOSEPH P. BLACK, OF ALTON, ILLINOIS, ASSIGNOR TO THE HAPGOOD PLOW COMPANY, OF SAME PLACE.

PLANTING-PLOW.

SPECIFICATION forming part of Reissued Letters Patent No. 10,745, dated July 13, 1886.

Original No. 331,938, dated December 8, 1885. Application for reissue filed May 14, 1886. Serial No. 202,207.

*To all whom it may concern:*

Be it known that I, JOSEPH P. BLACK, a citizen of the United States, residing at Alton, in the county of Madison and State of Illinois, have invented a new and useful Improvement in Planting-Plows, of which the following is a specification.

This invention relates to planting-plows of the class known as "listing-plows," and has the object of providing a planting-plow that shall run more steadily, less liable to tip over, more easily held in place, and less affected by uneven ground-surface than before. Heretofore such plows have been unwieldy and hard to hold and handle, being liable to tip from side to side as either share or side would penetrate the soil deeper than the other side, which in working in uneven ground made it difficult to hold and keep the plow in an upright position. In my improvements these difficulties are fully overcome.

The improvement consists, first, in providing two runners bearing upon the furrow-bottom near or at its sides for steadying the working and assisting in holding the plow in an upright position; second, in certain other improved construction of parts, combinations, and arrangements, which will first be shown and described in the specification and afterward pointed out in the claims.

Figure 1:
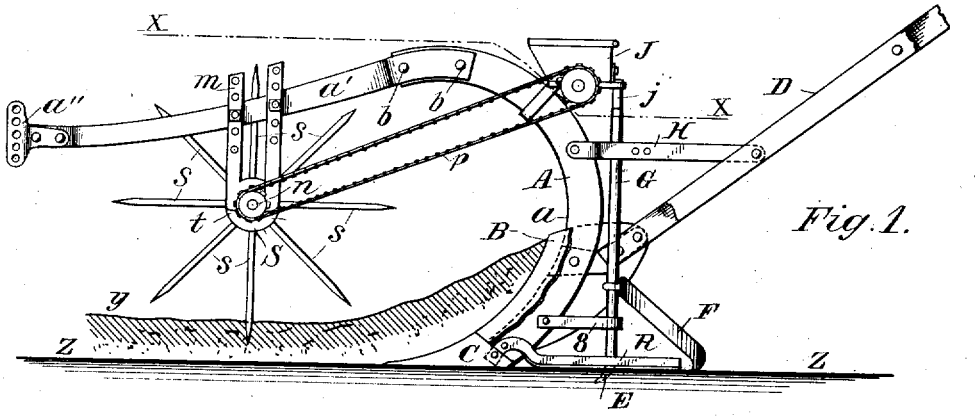
Figure 2:
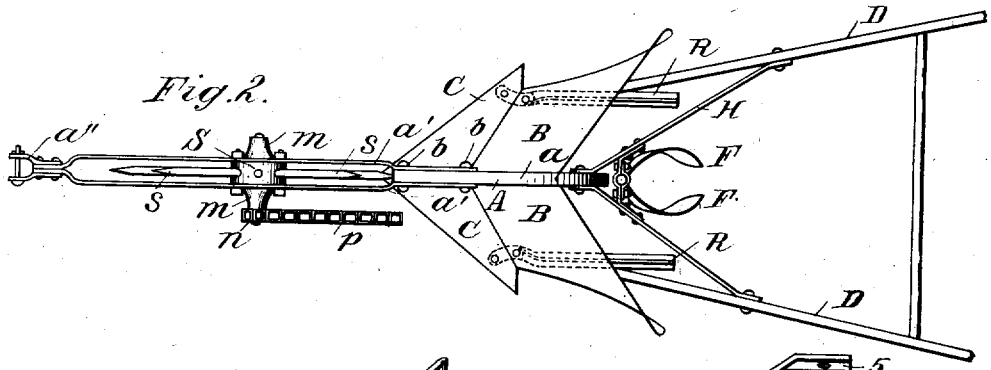
Figure 4:
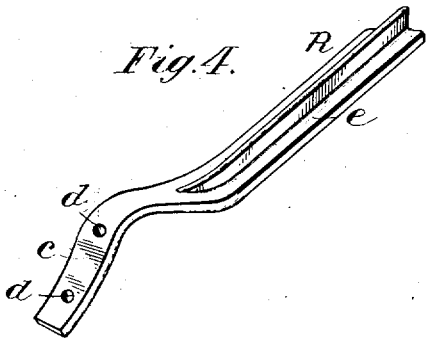
Figure 3:
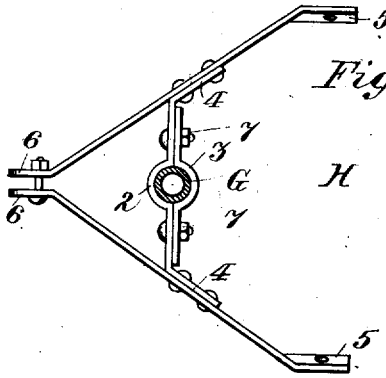

Referring to the drawings, like letters refer to like parts in all the figures, in which Figure 1 is a side elevation of my improved listing planting-plow, with parts of one handle and mold-board broken away to better show the detailed construction. Fig. 2 is a top or plan view with the seed-box J removed, to bring into view the brace-frame H, showing how said frame is combined and arranged with the plow-beam, handles, and seed-pipe, also showing how the two runners extend rearwardly from the sides of the plow. Fig. 3 is a top or plan view, enlarged, of the brace-frame H, showing its construction and how the seed-pipe is supported thereby. Fig. 4 is a perspective view, enlarged, of one of the runners R, showing how it may be constructed and how the lug *c* may be combined therewith.

The plow may be provided with the double or two shares, C C, the two mold-boards B B, with the handles D D, as in ordinary listing-plows, and mounted upon the beam A and the two runners R R connected thereto.

The seed-planting mechanism may consist of the ordinary seed-dropping box, J, operated by the wheel S, the seed-pipe G, and drill-tooth E, with the covering-blades F, as usual and well-known and shown in the drawings.

The beam A, which I name and call "open-bar beam," I preferably construct as follows: *a* represents the rear part, which may be termed "standard," consisting of a single bar bent curved, its rear end curved downwardly, and the mold-boards and share connected thereto, its front end curved forward to connect with the front part of said beam. *a′ a′* represent the front part, consisting of two flat bars having their front ends joined, and a clevis, *a″*, connected thereto, their rear ends embracing the front end of the said rear part and rigidly attached thereto by the bolts or rivets *b b*. The said flat bars *a′*, I preferably bend with offsets, so as to provide for a suitable space between them in which the wheel S may move without interference, as will be understood by inspecting the drawings. The said beam constructed as above shown is of a shape better adapted to connect with and support all the parts of the planting-plow, of lighter weight, and stronger than heretofore, and is one of the essential features of my invention.

S represents the sprocket-wheel for operating the seed-dropping box, consisting of the hub *t*, provided with the spokes *s*, rigidly set therein, and having their outer ends preferably sharp-pointed for easily entering the ground. The said wheel is journaled in the hangers *m m*, which may be adjustable up and down by the series of perforations in its arms, as shown in Fig. 1, by which the said wheel may be moved and adjusted up and down and the spokes made to enter the ground a greater or less depth, as may be desired.

*n* represents a pulley attached to the journal of the hub *t*, and caused to revolve by rotating the said wheel, and the belt *p*, connecting with the wheel *j*, operates the seed-dropping box, as will be understood by inspecting the drawings.

It will be observed in the arrangement and operation that the beam A admits the wheel S to be located and travel in the center line of working, in advance of the plow and between the bars *a' a'*, by which the spokes will enter the soil a greater or less depth and over uneven ground, and cause the wheel to rotate without any tendency to stagger, tip, or lift the plow from a level line of working, doing better work than heretofore, as will be understood by inspecting Fig. 1, in which *y* represents the uneven top of the ground, and *z* the line of level working of the plow. To the said listing-plow, provided with a double plow having two mold-boards and adapted to open a wide furrow, I attach two runners, one upon either side of the plow, extending rearwardly on a level with the bottom of the plow in a manner adapted to slide upon the furrow-bottom near or at its two sides, to act and operate as steadying-bars to prevent careening or tipping, and to assist in holding the plow in an upright position, by which the plow is operated with greater ease than heretofore.

R represents the runner, consisting of an ordinary bar of iron or steel, *e*, of suitable length, having its front end provided with a head or lug adapted for attachment to the plow. The said front end may preferably be bent upwardly as a sled-runner, to more readily slide upon the furrow-bottom, and the said head or lug *c* may preferably be provided with two perforations, *d d*, and serve the double purpose to connect the runner to the plow, and to connect the outer end of the share to the mold-board, as will be understood by inspecting the drawings.

H represents what I call and name "brace-frame," connecting and bracing the beam with the handles and seed-pipe, as shown, consisting of two flat bars, 1 1, with their ends perforated and bent for attachment to the beam A and handles D D, the cross-bar 2, having its ends 4 4 bent and rigidly attached to the bars 1 1, and its center part formed to fit and support the seed-pipe G, and the cap-bar 3, embracing the seed-pipe G, and adjustably attached to the said cross-bar 2 with bolts 7 7, as shown in detail in Fig. 3, by which the bars 1 1 connect and brace the handles with the beam. The cross-bar 2 affords a seat and support for connecting the seed-pipe G, and the cap 3 admits the seed-pipe G being moved and adjusted up and down, and rigidly held in any desired position, as will be understood by inspecting the drawings.

In operation the plow opens a wide furrow in advance, dividing the furrow-slice and throwing it to either side clean from the furrow into ridges outside of the furrow. The runners steady the working of the plow, preventing its careening or tipping from side to side, and make a more level furrow. The sharp-pointed arms of the sprocket-wheel insure a constant movement of the seed dropping without affecting the level working of the plow through uneven ground, and, following the plow, the seed-planting mechanism drops and plants the seeds along the center of the said furrow, all of which has been herein fully shown.

I am aware that the use of a runner or bar following a plow to steady its working and gage its depth is not new; but I am not aware of any heretofore use of two runners so located on a double-mold-board plow or listing-plow as to prevent its careening or tipping and to assist in holding the plow in an erect position.

Having thus set forth my invention, I claim—

1. The beam A, its rear part consisting of a single bar bent curved and supporting the mold-board and share, its front part consisting of two bars having their front ends joined and supporting a clevis, their rear ends embracing the said rear part and rigidly attached thereto, and a suitable space between the said two bars to admit an operating-wheel, in combination with a listing-plow provided with seed-planting mechanism and an operating-wheel, all substantially as and for the purpose set forth.

2. The combination of the beam A, its rear part a single bar, its front part of two bars at a distance apart, with their front ends joined and supporting a clevis, the sprocket-wheel S, provided with pointed spokes or arms, with a listing-plow, and with seed-planting mechanism, substantially as and for the purpose set forth.

3. The sprocket-wheel S, consisting of a hub provided with spokes rigidly attached thereto, and having their outer ends pointed, and the two hangers *m m*, adjustable up and down, in combination with the beam A, having its rear part of a single bar and its front part of two bars, and with a listing-plow provided with seed-planting mechanism with covering-blades, all substantially as and for the purpose set forth.

4. In a planting-plow, the combination of the sprocket-wheel S, with the hangers *m m*, pulley *n*, and belt *p*, with the beam A, provided with and carrying the share C, the mold-boards B, seed-box J, seed-pipe G, drill-tooth E, covering-blades F, and handles D, all constructed and arranged to operate substantially as and for the purpose specified.

5. The runner R, provided with the lug *c*, with perforations *d d*, adapted to serve the double purpose to connect to the plow and to connect the share to the mold-board, substantially as and for the purpose set forth.

6. The combination of two runners, consisting of ordinary bars provided with heads or lugs for attaching to the plow, with a listing-plow provided with double mold-boards adapted to opening a wide furrow, substantially as and for the purpose set forth.

7. The combination of the listing-plow, provided with the two runners R R, with the seed-planting mechanism, substantially as shown, and for the purpose set forth.

8. The brace-frame H, consisting of two flat bars, 1 1, having their ends bent, perforated, and attached to the beam and handles, the cross-bar 2, and the cap 3, embracing the seed-pipe and connected to the said bars *l l*, all constructed, arranged, and adapted to operate substantially as and for the purpose set forth.

9. In a planting-plow, the combination of the open-bar beam A, the sprocket-wheel S, the share C, mold-boards B B, the seed-box J, seed-pipe G, drill-tooth E and covering-blades F, the brace-frame H, and the handles D, all substantially as and for the purpose shown.

JOSEPH P. BLACK.

Witnesses:

F. H. FERGUSON,

CHAS. S. PHILIPS.